US011203946B2

(12) United States Patent
Jonnalagadda et al.

(10) Patent No.: US 11,203,946 B2
(45) Date of Patent: Dec. 21, 2021

(54) FEEDER DUCT ASSEMBLY WITH FLEXIBLE END FITTINGS

(71) Applicant: Unison Industries, LLC, Jacksonville, FL (US)

(72) Inventors: Dattu G V Jonnalagadda, Karnataka (IN); Greedaran Kubendran Jankin, Karnataka (IN); Bruce Patrick Graham, Springboro, OH (US); Rachamadugu Sivaprasad, Karnataka (IN); Douglas R. Millward, Beavercreek, OH (US)

(73) Assignee: Unison Industries, LLC, Jacksonville, FL (US)

( * ) Notice: Subject to any disclaimer, the term of this patent is extended or adjusted under 35 U.S.C. 154(b) by 481 days.

(21) Appl. No.: 15/586,618

(22) Filed: May 4, 2017

(65) Prior Publication Data
US 2017/0321562 A1 Nov. 9, 2017

(30) Foreign Application Priority Data
May 4, 2016 (IN) .............................. 201641015601

(51) Int. Cl.
*F01D 9/02* (2006.01)
*F01D 11/00* (2006.01)
(Continued)

(52) U.S. Cl.
CPC .............. *F01D 9/023* (2013.01); *B64D 33/00* (2013.01); *F01D 11/003* (2013.01); *F02C 6/08* (2013.01);
(Continued)

(58) Field of Classification Search
CPC ... F16L 3/26; F16L 9/003; F16L 23/02; F16L 23/032; F16L 23/14; F16L 23/12;
(Continued)

(56) References Cited

U.S. PATENT DOCUMENTS 5,117,629 A 6/1992 Shaw
5,203,593 A * 4/1993 Brandener ............ F16L 27/073
285/263
(Continued)

FOREIGN PATENT DOCUMENTS

EP 2 128 023 A1 12/2009
JP H03-253716 A 11/1991
(Continued)

OTHER PUBLICATIONS

Extended European Search Report and Opinion issued in connection with corresponding EP Application No. 17168054.9 dated Oct. 11, 2017.
(Continued)

*Primary Examiner* — Matthew Troutman
*Assistant Examiner* — William S. Choi
(74) *Attorney, Agent, or Firm* — McGarry Bair PC

(57) ABSTRACT

A feeder duct assembly for a gas turbine engine, which negates the need for a ball or axial joint in the duct for required for flexibility under thermal loading. The feeder duct assembly of the present innovation comprises an end fitting designed to meet flexibility requirements without compromising dynamic performance of the system with added weight from ball or axial joints in the ducts.

11 Claims, 4 Drawing Sheets

(51) Int. Cl.
*F02C 6/08* (2006.01)
*F02C 9/18* (2006.01)
*F02C 7/28* (2006.01)
*B64D 33/00* (2006.01)
*F16L 23/18* (2006.01)
*F16L 23/02* (2006.01)
*F16L 27/12* (2006.01)
*F16L 23/12* (2006.01)
*F16L 23/14* (2006.01)

(52) U.S. Cl.
CPC .................. *F02C 7/28* (2013.01); *F02C 9/18* (2013.01); *F05D 2260/30* (2013.01); *F05D 2260/31* (2013.01); *F16L 23/02* (2013.01); *F16L 23/12* (2013.01); *F16L 23/14* (2013.01); *F16L 23/18* (2013.01); *F16L 27/12* (2013.01); *Y02T 50/60* (2013.01)

(58) Field of Classification Search
CPC ......... F16L 27/053; F16L 27/12; F16L 23/18; F16L 47/14; F16L 49/04; F16L 23/00; F16L 23/16; F01D 9/023; F01D 11/003; F05D 2260/31; F04D 29/545
USPC .......................... 285/368, 225, 363, 405, 412
See application file for complete search history.

(56) References Cited

U.S. PATENT DOCUMENTS

| 5,511,828 | A | * | 4/1996 | Kurek ..................... F16L 27/11 |
| | | | | 285/49 |
| 5,779,282 | A | * | 7/1998 | Ezze ....................... F16L 27/04 |
| | | | | 285/368 |
| 5,944,363 | A | * | 8/1999 | Cwik ..................... F16L 27/053 |
| 8,047,470 | B2 | | 11/2011 | Porte |
| 2015/0308289 | A1 | | 10/2015 | Lacroix et al. |

FOREIGN PATENT DOCUMENTS

JP 2847223 A 1/1999
JP 2009-531595 A 9/2009

OTHER PUBLICATIONS

Canadian Office Action issued in connection with corresponding CA Application No. 2,964,655 dated Feb. 1, 2019, 4 pages.
Machine Translation and Notification of Reasons for Refusal issued in connection with corresponding JP Application No. 2017-084099 dated May 22, 2018.

* cited by examiner

FEEDER DUCT ASSEMBLY WITH FLEXIBLE END FITTINGS

BACKGROUND OF THE INVENTION

Turbine engines, and particularly gas or combustion turbine engines, are rotary engines that extract energy from a flow of combusted gases passing through the engine in a series of compressor stages, which include pairs of rotating blades and stationary vanes, through a combustor, and then onto a multitude of turbine stages, also including multiple pairs of rotating blades and stationary vanes.

Feeder duct assemblies are provided about the turbine engine and provide conduits for the flow of various operating fluids to and from the turbine engine. One of the operating fluids is bleed air. In the compressor stages, bleed air is produced and taken from the compressor via feeder ducts. Bleed air from the compressor stages in the gas turbine engine can be utilized in various ways. For example, bleed air can provide pressure for the aircraft cabin, keep critical parts of the aircraft ice-free, or can be used to start remaining engines. Configuration of the feeder duct assembly used to take bleed air from the compressor requires rigidity under dynamic loading, and flexibility under thermal loading. Current systems use ball joints or axial joints in the duct to meet requirements for flexibility, which compromise system dynamic performance by increasing the weight of the system.

Gas turbine engines have been used for land and nautical locomotion and power generation, but are most commonly used for aeronautical applications such as for airplanes, including helicopters. In airplanes, gas turbine engines are used for propulsion of the aircraft.

BRIEF DESCRIPTION

In one aspect, embodiments of the innovation relate to a feeder duct assembly for a gas turbine engine which comprises a flexible end fitting, with the feeder duct assembly comprising an end fitting defining a fluid inlet to the gas turbine engine, a feeder duct fluidly coupled to the fluid inlet, a seal fluidly sealing the feeder duct to the end fitting, and a dynamic mount securing the feeder duct to the end fitting.

In another aspect, embodiments of the innovation relate to a feeder duct assembly comprising an end fitting having an interface flange, a feeder duct having a terminal end and a circumferential flange with a circumferential seal encircling the feeder duct and located between the interface flange and the circumferential flange, at least one pair of biasing elements sandwiching a portion of the circumferential flange, and a fastener securing the circumferential flange and intermediate flange to the end fitting and compressing the pair of biasing elements.

In yet another aspect, embodiments of the innovation relate to a method of securing a feeder duct to an end fitting of a gas turbine engine, the method comprising fluidly sealing a terminal end of the feeder duct to the end fitting while flexibly mounting the terminal end of the feeder duct to the end fitting.

DETAILED DESCRIPTION

The described embodiments of the present innovation are directed to systems, methods, and other devices related to routing air flow in a turbine engine. For purposes of illustration, the present innovation will be described with respect to an aircraft gas turbine engine. It will be understood, however, that the innovation is not so limited and may have general applicability in non-aircraft applications, such as other mobile applications and non-mobile industrial, commercial, and residential applications.

Figure 1:
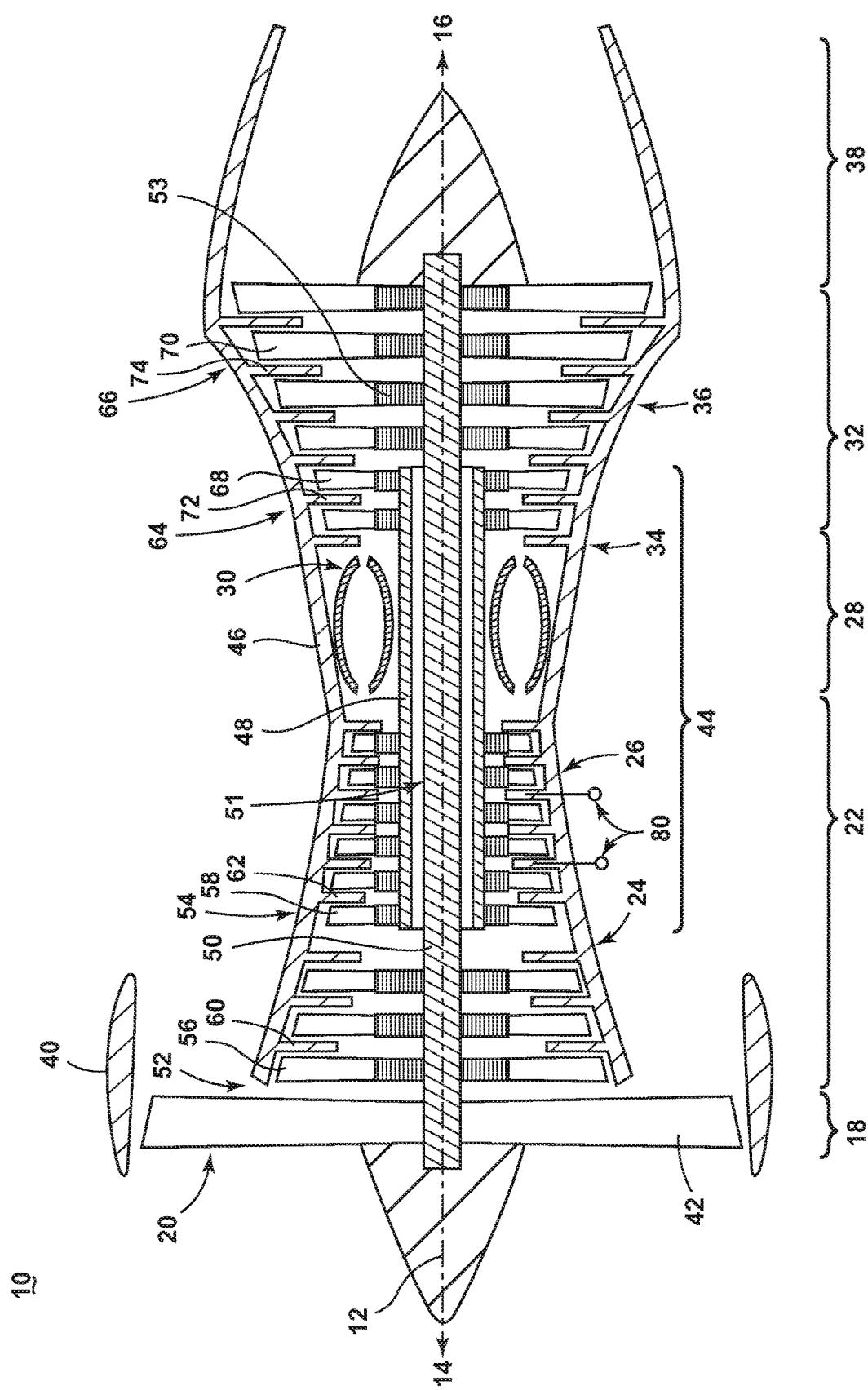
FIG. 1 is a schematic, sectional view of a gas turbine engine in accordance with various aspects described herein.

FIG. 1 is a schematic cross-sectional diagram of a gas turbine engine 10 for an aircraft. The engine 10 has a generally longitudinally extending axis or centerline 12 extending from forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a plurality of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, respectively, with each stage having its own disk. The vanes 60, 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the air from the compressor section 22 can be bled off via one or more feeder duct assemblies 80, and be used for cooling of portions, especially hot portions, such as the HP turbine 34, and/or used to generate power or run environmental systems of the aircraft such as the cabin cooling/heating system or the deicing system. In the context of a turbine engine, the hot portions of the engine are normally downstream of the combustor 30, especially the turbine section 32, with the HP turbine 34 being the hottest portion as it is directly downstream of the combustion section 28. Air that is drawn off the compressor and used for these purposes is known as bleed air.

Figure 2:
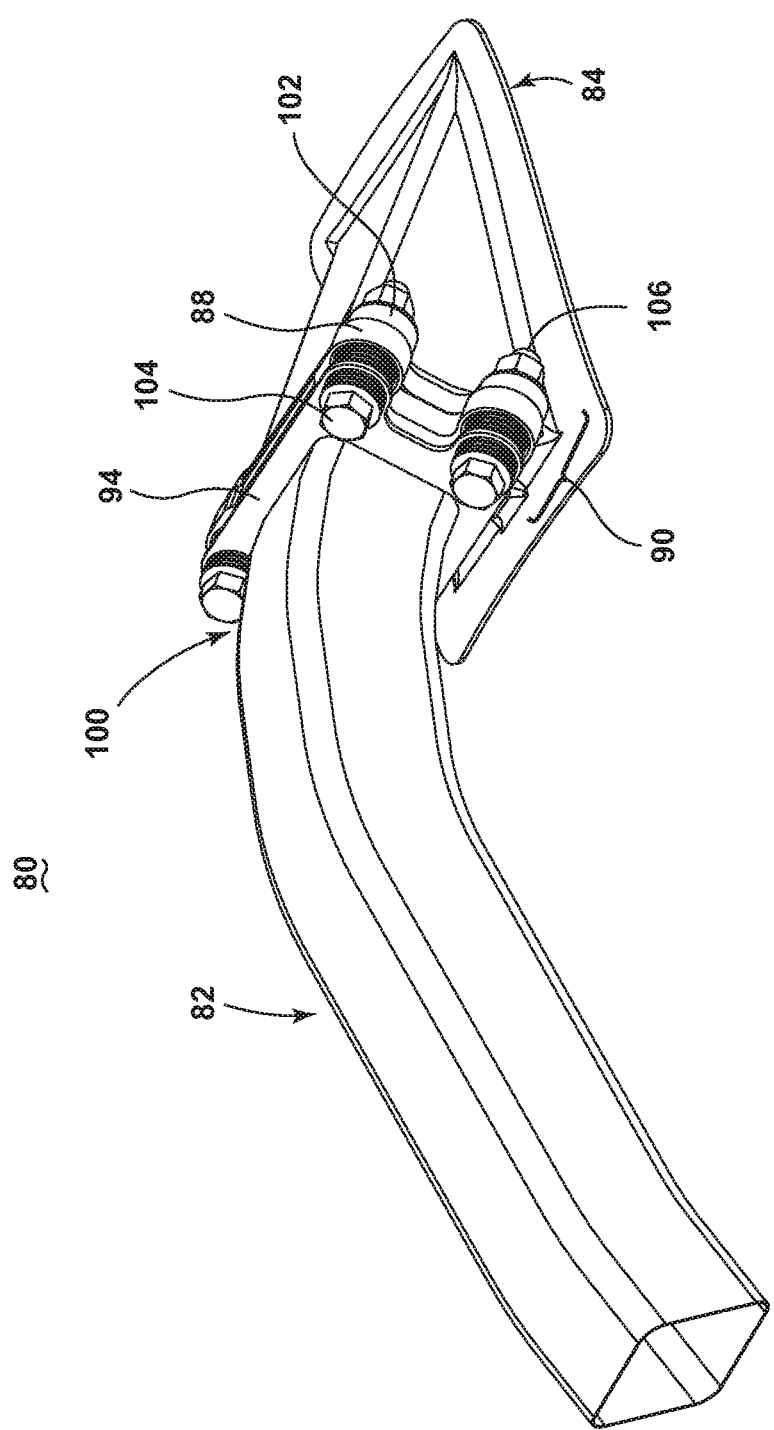
FIG. 2 is a schematic assembled view of an example feeder duct assembly that can be utilized for a gas turbine engine in accordance with various aspects described herein.

Referring to FIG. 2, an exemplary feeder duct assembly 80 is illustrated and comprises a feeder duct 82 coupled to an end fitting 84 by a dynamic mount 90. The dynamic mount 90 couples the feeder duct 82 to the end fitting 84 such that the feeder duct 82 is free to move relative to the end fitting 84 while still maintaining a fluid connection. The dynamic mount 90 provides for the feeder duct 82 to move axially, including reciprocation, as well as pivoting relative to the end fitting 84. Thus, vibrations and other variable forces that tend to move the feeder duct 82 in a plurality of directions are accommodated without fatiguing the connection with the end fitting 84. As the dynamic mount 90 is located at the junction of the feeder duct 82 and the end fitting 84, the dynamic mount 90 does not add additional mass to the feeder duct 82, which could function as a suspended mass also subject to the vibrations and other forces acting on the feeder duct 82. The dynamic mount 90 can be in the form of any mechanism capable of coupling the feeder duct 82 to the end fitting 84 such as an E-type seal, spring systems, and compression seals.

Figure 3:
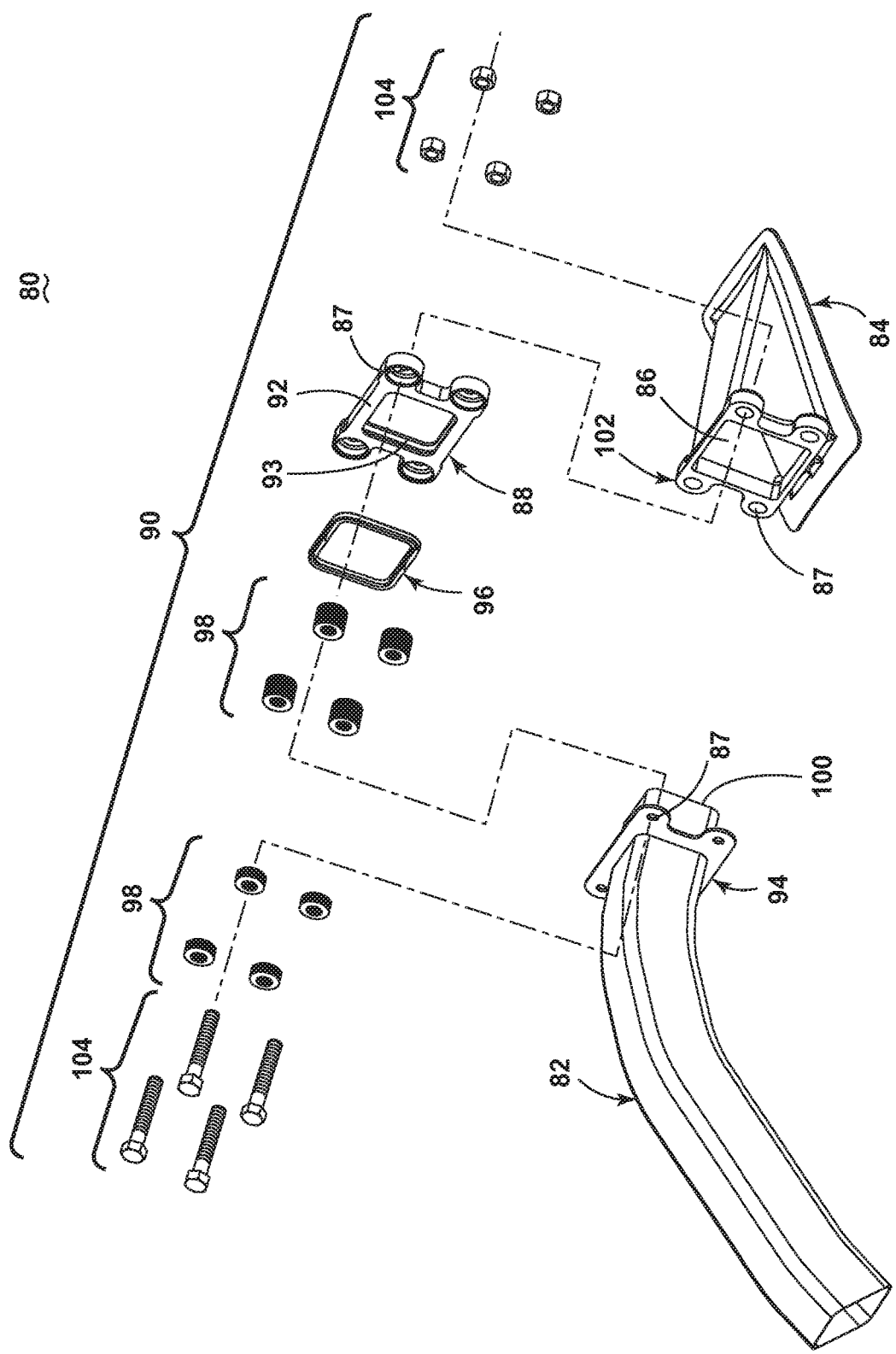
FIG. 3 is a schematic exploded view of an example feeder duct assembly that can be utilized for a gas turbine engine in accordance with various aspects described herein.

Referring to FIG. 3, the dynamic mount 90 is shown exploded to better illustrate its details in the environment of the feeder duct 82 and end fitting 84. The feeder duct 82 terminates at a terminal end 100 and has an external duct flange 94, or circumferential flange, spaced from the terminal end 100 so that the terminal end 100 of the feeder duct 82 can pass into the feeder duct assembly towards the end fitting 84. The end fitting 84 comprises a face flange 102 or interface flange which defines a fluid inlet 86. The dynamic mount 90 dynamically secures the duct flange 94 to the face flange 102. By dynamically secures, it is meant that the fluid connection between the feeder duct 82 and the end fitting 84 is maintained while the feeder duct 82 is permitted to move as least one of axially, including reciprocation, or pivoting relative to the end fitting 84. In this sense, the duct flange 94 and face flange 102 can be considered components of the dynamic mount 90.

The dynamic mount 90 further includes a seal assembly having a seal flange 88 holding a seal 96, which can be a compressible seal, and biasing elements 98 (e.g., springs, etc.) dynamically coupling the seal flange 88 to the duct flange 94 and face flange 102.

Fasteners 104 retain the duct flange 94, biasing elements 98, seal flange 88, and face flange 102 as a collective unit. The duct flange 94, the seal flange 88, and the face flange 102, all comprise mounting openings 87 through which the fasteners pass. Similarly, the biasing elements 98 having openings through which the fasteners pass.

The biasing elements 98 can be arranged in multiple pairs about the duct flange 94. For example, the biasing elements 98 can include four Belleville springs pairs (as shown in FIG. 3) with a pair located at each corner of the flanges 88, 94, 102. However, other arrangements are contemplated and will vary depending on the shape and size of the feeder duct.

The seal flange 88 is located between the duct flange 94 and the face flange 102 and can comprise an intermediate flange or collar 92. The inner surface of the collar 92 can have a circumferential channel 93 in which the seal 96 is located. The seal 96, or circumferential seal, can be any seal and is shown here as a diaphragm seal, which provides for the seal to remain in contact with the feeder duct 82 as it moves dynamically relative to the end fitting 84.

Figure 4:
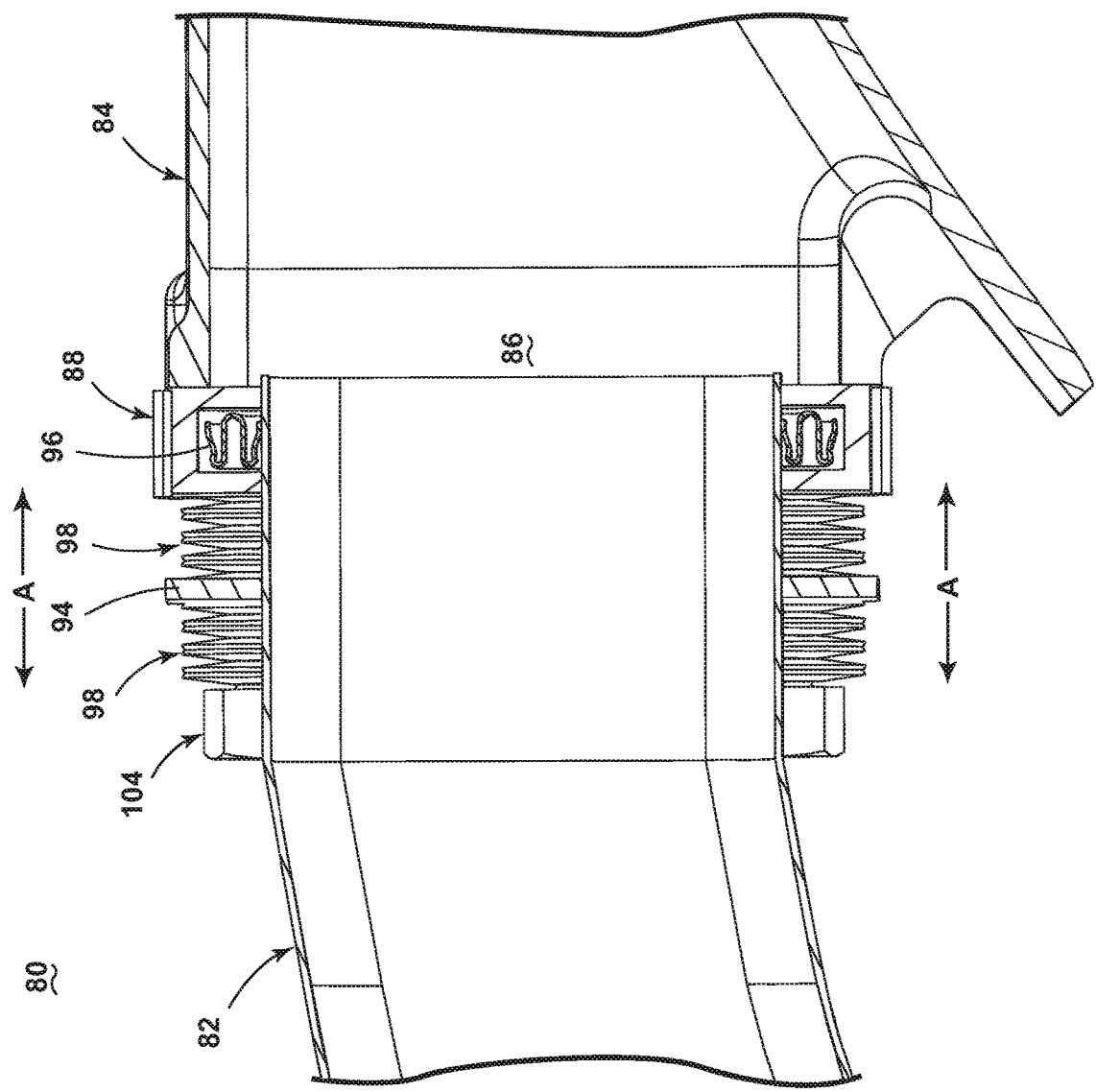
FIG. 4 is a schematic cross-sectional view of an example feeder duct assembly that can be utilized for a gas turbine engine in accordance with various aspects described herein.

Referring to FIG. 4, the feeder duct assembly 80 is shown in an assembled condition, which serves to fluidly couple the feeder duct 82 to the fluid inlet 86, by the terminal end 100 passing through the collar 92 of the seal flange 88 and opening up to the fluid inlet 86 of the end fitting 84. In this assembled condition, the seal 96 is compressively retained by the collar 92 against the exterior of the feeder duct 82 to fluidly seal the feeder duct 82 relative to the end fitting 84.

The dynamic mount 90 dynamically secures the feeder duct 82 to the end fitting 84 with the fasteners 104 which pass through the aligned mounting openings 87, the biasing elements 98, the duct flange 94, the seal flange 88, and the face flange 102 to compressively retain the duct flange 94 with the biasing elements 98 and secure the duct flange 94 and the seal flange 88, to the face flange 102 of the end fitting 84.

The biasing elements 98, which are held under compression on both sides of the duct flange 94, form a composite structure of the duct flange 94 interposed between the biasing elements 98, resulting in a sandwiching of the duct flange 94 between the biasing elements 98, while being constrained to the end fitting 84, thereby enabling the duct flange 94 to move relative to the biasing elements 98 in response to movement of the feeder duct 82. As the biasing elements 98 are under compression on each side of the duct flange 94, the opposing spring forces biasing the duct flange 94 back to a neutral position. Thus any movement of the duct flange 94 off of the neutral position, which can be caused by the movement of the feeder duct 82, is countered by the biasing elements 98, which then return the duct flange 94 to its neutral position, where the forces substantially equal on each side of the duct flange 94.

More specifically, as a force acts on the feeder duct 82, the resulting movements of the feeder duct 82 causes a movement of the duct flange 94 illustrated by arrows A. The movement is countered by the biasing elements 98 to return the duct flange 94 back to neutral position. Depending on the direction that the external force acts on the feeder duct 82, the duct flange 94 can be axially moved, even reciprocated, relative to the end fitting 84. It is also possible for the duct flange 94 to pivot relative to the end fitting 84. For example, in FIG. 4, the top most portion of the duct flange 94 can move to the left and the bottom most portion of the duct flange 94 can move to the right as viewed in FIG. 4. This pivoting motion can be thought of as a front/back pivoting with respect to FIG. 4. There can also be a side-to-side pivoting, which would be in and out of the image of FIG. 4. There can also be combinations of these two movements. All of the movements are countered by the biasing elements 98.

With this structural configuration, a method for securing a feeder duct to an end fitting of a gas turbine engine includes fluidly sealing the terminal end 100 of the feeder duct 82 to the end fitting 84 while flexibly mounting the terminal end 100 of the feeder duct 82 to the end fitting 84. Fluidly sealing the terminal end 100 of the feeder duct 82 to the end fitting 84 comprises circumferentially sealing the feeder duct relative to the end fitting, and flexibly mounting the terminal end 100 of the feeder duct 82 to the end fitting 84 comprises compressively retaining a portion of the terminal end 100 of the feeder duct to the end fitting.

This written description uses examples to disclose the innovation, including the best mode, and also to enable any person skilled in the art to practice the innovation, including making and using any devices or systems and performing any incorporated methods. The patentable scope of the innovation is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A feeder duct assembly for a gas turbine engine comprising:
   an end fitting defining a fluid inlet to the gas turbine engine;
   a feeder duct fluidly coupled to the fluid inlet;
   a seal flange provided between the end fitting and the feeder duct, the seal flange including a circumferential channel and a seal located within the circumferential channel and fluidly sealing the feeder duct to the end fitting; and
   a dynamic mount securing the feeder duct to the end fitting,
   wherein the feeder duct comprises an exterior flange, the end fitting has a face flange, and the seal flange is located between the exterior flange and the face flange with at least a portion of the seal flange in direct contact with the face flange;
   wherein the dynamic mount further comprises at least one biasing element, which comprises at least one spring pair sandwiching the exterior flange, such that one spring of the at least one spring pair is located between the exterior flange and the seal flange.

2. The feeder duct assembly according to claim 1, wherein the seal is a compressible seal circumscribing the feeder duct.

3. The feeder duct assembly according to claim 2, wherein the seal flange further comprises a collar with the circumferential channel and the compressible seal is located within the circumferential channel.

4. The feeder duct assembly according to claim 1, wherein the at least one biasing element is compressively retained between a portion of the feeder duct and at least one of the seal or the end fitting.

5. The feeder duct assembly according to claim 1, further comprising a fastener securing the at least one spring pair, exterior flange, seal flange, and face flange to compressively retain the exterior flange between the at least one spring pair.

6. The feeder duct assembly according to claim 5 wherein the seal flange comprises a collar with the circumferential channel including the seal and encircling the feeder duct, with the seal being a compressible seal.

7. The feeder duct assembly according to claim 5, wherein the feeder duct has a terminal end and the exterior flange is spaced from the terminal end.

8. The feeder duct assembly according to as claimed in claim 1, wherein the at least one biasing element comprises multiple biasing elements located about the exterior of the exterior flange.

9. A feeder duct assembly comprising:
   an end fitting having an interface flange;
   a feeder duct having a terminal end and a circumferential flange spaced from the terminal end;
   a seal flange including an intermediate flange with a circumferential seal encircling the feeder duct, the seal flange located between the interface flange and the circumferential flange with at least a portion of the seal flange in direct contact with the interface flange;
   at least one pair of biasing elements sandwiching a portion of the circumferential flange; and
   a fastener securing the circumferential flange and intermediate flange to the end fitting and compressing the pair of biasing elements;
   wherein the intermediate flange further includes a circumferential channel and the circumferential seal is located within the circumferential channel.

10. The feeder duct assembly according to as claimed in claim 9, wherein the at least one pair of biasing elements comprises multiple pairs of biasing elements located about an exterior of the feeder duct.

11. The feeder duct assembly according to claim 9, wherein the circumferential seal comprises a compressible seal located within the circumferential channel on an inner surface of the intermediate flange.

* * * * *